Feb. 20, 1962 O. TSCHUMI ET AL 3,022,493

PLURAL FREQUENCY RESPONSIVE CIRCUITS FOR PORTABLE RECEIVING SETS

Filed Nov. 22, 1957 4 Sheets-Sheet 1

INVENTORS:
OTTO TSCHUMI
HANS KAPPELER
HANS BLÖCHLINGER
ALOIS ZIMMERMANN

By Kurt Kelman
Att'y

Feb. 20, 1962 O. TSCHUMI ET AL 3,022,493

PLURAL FREQUENCY RESPONSIVE CIRCUITS FOR PORTABLE RECEIVING SETS

Filed Nov. 22, 1957 4 Sheets-Sheet 2

INVENTORS:
OTTO TSCHUMI
HANS KAPPELER
HANS BLÖCHLINGER
ALOIS ZIMMERMANN

BY [signature]
ATT'Y

INVENTORS:
OTTO TSCHUMI
HANS KAPPELER
HANS BLÖCHLINGER
ALOIS ZIMMERMANN
By Karl Linders (signature)
Att'y INVENTORS:
OTTO TSCHUMI
HANS KAPPELER
HANS BLÖCHLINGER
ALOIS ZIMMERMANN
By [signature], Att'y

United States Patent Office 3,022,493

Patented Feb. 20, 1962

3,022,493

PLURAL FREQUENCY RESPONSIVE CIRCUITS FOR PORTABLE RECEIVING SETS

Otto Tschumi, Hans Kappeler, Hans Blöchlinger, and Alois Zimmermann, all of Solothurn, Switzerland, assignors to Autophon Aktiengesellschaft, Solothurn, Switzerland Filed Nov. 22, 1957, Ser. No. 698,223
Claims priority, application Switzerland Nov. 28, 1956
1 Claim. (Cl. 340—171)

This invention relates to electrical circuits, and more particularly to circuits adapted for use in portable call receiving sets and the like.

Radio systems for locating individuals are known wherein from a central station, transmitting loops placed around buildings or courtyards, are supplied with alternating currents of varying frequencies, and the persons to be located are equipped with portable receivers. For the purpose of identifying the receiver to be called, systems have been proposed wherein a sequence of different frequencies is transmitted by the transmitting station either directly or as modulation of a carrier, and releases in the receiver which is designed to respond to this particular sequence of frequencies, an acoustic signal. In systems of this kind, the electrical and mechanical design of the portable receiving sets pose very special problems as for manifest reasons, these sets must be simple and of light weight.

It is a primary object of the present invention to provide improved circuits particularly though not exclusively adapted for use in portable receiving sets and the like whereby the simplicity, and the weight and operational characteristics of such sets are materially enhanced.

Other objects, and the manner in which the same are attained, will become apparent as this specification proceeds.

The invention involves circuits particularly adapted for use in portable receiving sets forming part of a radio locating system, which circuits trigger a certain process in response to the reception of a sequence of signals, consisting of several frequencies, correlated with each individual circuit. Any circuit according to the invention comprises a number of channels corresponding to the number of frequencies contained in the afore-noted sequence of signals. Each of these channels contains a filter tuned to one of the frequencies of the sequence, and has an ordinal number corresponding to the relative position of the corresponding frequency within the sequence. In contrast to similar circuits for evaluating frequency sequences, the present circuits require only a relatively short, internally generated retardation time. The circuits according to the invention are distinguished in that the frequencies received are supplied to the channels in parallel, and that means are provided for blocking, in the state of repose, all channels except the first one, and to unblock the same in dependence on a signal passing through the channel preceding in the order. When this signal is eliminated, the initiation of the blocked state takes place with a retardation. The invention contemplates further that the signals passing in a channel equipped with the afore-noted blocking components, effect the maintenance of the unblocked condition of the blocking components correlated with the respective channel, and that the signals passing through the last channel, in addition, release the afore-mentioned procedure.

In the drawings accompanying this specification and forming part thereof, four embodiments of the invention are shown diagrammatically by way of example.

The following preliminary remarks refer to all embodiments of the invention. The description of the invention is based on the assumption that the transistors are of the p-n-p type, and the polarity of the circuits described has been assumed correspondingly. By a reversal of all polarities, the circuits can be used, of course, in conjunction with transistors of the n-p-n type, as well.

In a radio receiving set incorporating a circuit according to the invention, the signal is amplified in a first stage. If the system involves a modulated high frequency carrier, this first stage also serves for demodulation purposes. From the pre-amplifier, the signal reaches, at the point E, the evaluation system. An embodiment of such a preliminary stage (not designed for demodulation) is shown in FIG. 4, in a dot and dash frame designated as VV. This circuit contains the two transistors T1 and T2; a detailed description is dispensed with as it is a thoroughly conventional amplifier. This pre-amplifier amplifies the signals passing from the ferrite antenna FA to its input, and delivers the signals thus amplified, at the point E, to the evaluation system. The remaining figures (FIGS. 1–3) do not show this pre-amplifier but only its output E which coincides with the input of the respective evaluation system. These evaluation circuits contain band-pass filters BF or crystal filters including crystals Q, transistors T and rectifiers D or V. The combination of a filter with a transistor connected in series therewith, which combination permits the passage of only one frequency, will be referred to below as a "channel."

Figure 2:
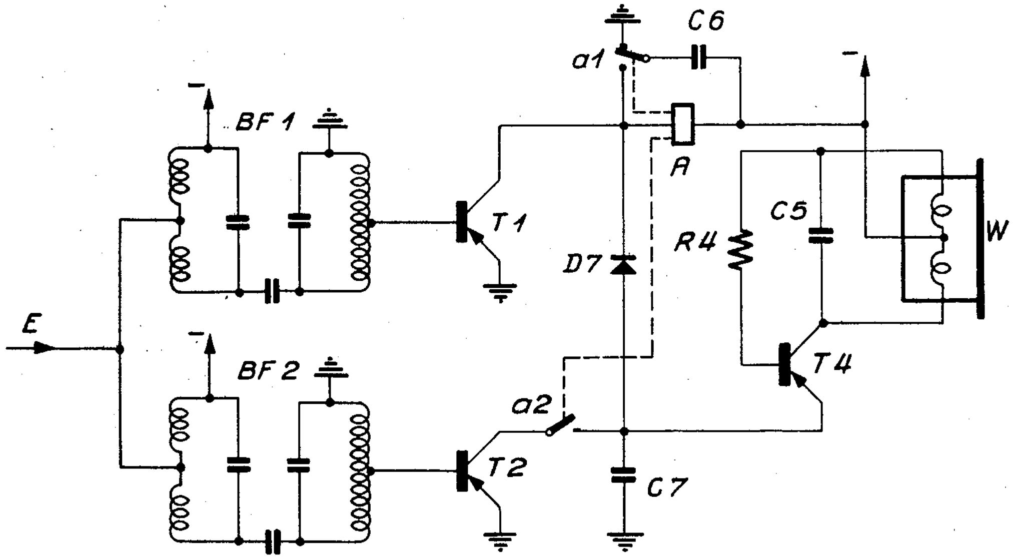
FIG. 2 illustrates a similar circuit for evaluating a sequence of two frequencies which, however, includes electro-mechanical as well as electronic components.

Referring now to individual figures of the drawing, and first to FIG. 2, this shows that the signals are passed from E to channels 1 and 2 (BF1 and BF2). In the condition of rest, the collector circuit of the transistor T2 is interrupted by the contact *a*2. Due to the open state of this contact, no action can be triggered unless a frequency passed by the first channel reaches the receiver. Since with the transistor T1, the base is connected with ground via a band filter coil, and the emitter is grounded directly, this transistor, in the condition of rest, is non-conductive. As soon as a voltage arrives via the band filter 1, however, each negative half-wave of this voltage gives rise to a flow of current from the emitter to the base of the transistor T1, which results in an increased current from the emitter to the collector. This current energizes the relay A which closes the contacts *a*1 and *a*2 and thus, on the one hand, connects the condenser C6 in parallel to its winding and, on the other hand, closes the collector circuit of the transistor T2, with the result that channel 2 is unblocked. Since the base and the emitter of the transistor T2 are grounded as long as no voltage is present on the band filter BF2, at first no current passes from the emitter to the collector. When the passage of the frequency through the first channel ceases, the relay A is still held, for a certain time, by the discharging of the condenser C6. If during this time, a signal arrives which corresponds to the pass frequency of the second channel, a current passes, during the negative half-wave of the voltage at the output of the band filter BF2, from the emitter to the base of the transistor T2. Due to the amplifying action of the transistor, current passes also from the emitter to the collector and further through the contact *a*2 and the relay coil A. In consequence, relay A is held as long as a signal passes through the channel 2. Besides, condenser C7 which is in the condition of rest, is on the voltage of the battery, is discharged and maintains the potential on the collector of the transistor T2 substantially constant also during the positive half-wave, during which no current passes from the base to the emitter.

The electro-acoustic transducer W, the condenser C5 connected in parallel thereto, the resistor R4 and the transistor T4, together, form a tone generator wherein the frequency is determined by the oscillating circuit consisting of the condenser C5 and the coil of the transducer W. Since the supply is fed to the center of the coil, the upper end of the oscillating circuit has a potential which is in phase opposition relative to the potential of the lower end connected with the collector. The first-named potential, together with a fixed bias, is returned as feedback across the resistor R4 to the base of the transistor T4 so that the tone generator oscillates. The ensuing oscillations are maintained as long as the frequency corresponding to the second channel is received, for while this frequency arrives, the condenser C7 is maintained, via the transistor T2, in discharged condition, and the relay A is maintained, via the rectifier D7, in pulled condition. The principle of the circuit resides in that by signals passing through the first channel (BF1), the second channel (BF2) is unblocked and that by signals passing in the second channel, on the one hand this unblocking is maintained and on the other hand, an alert signal is released.

Figure 1:
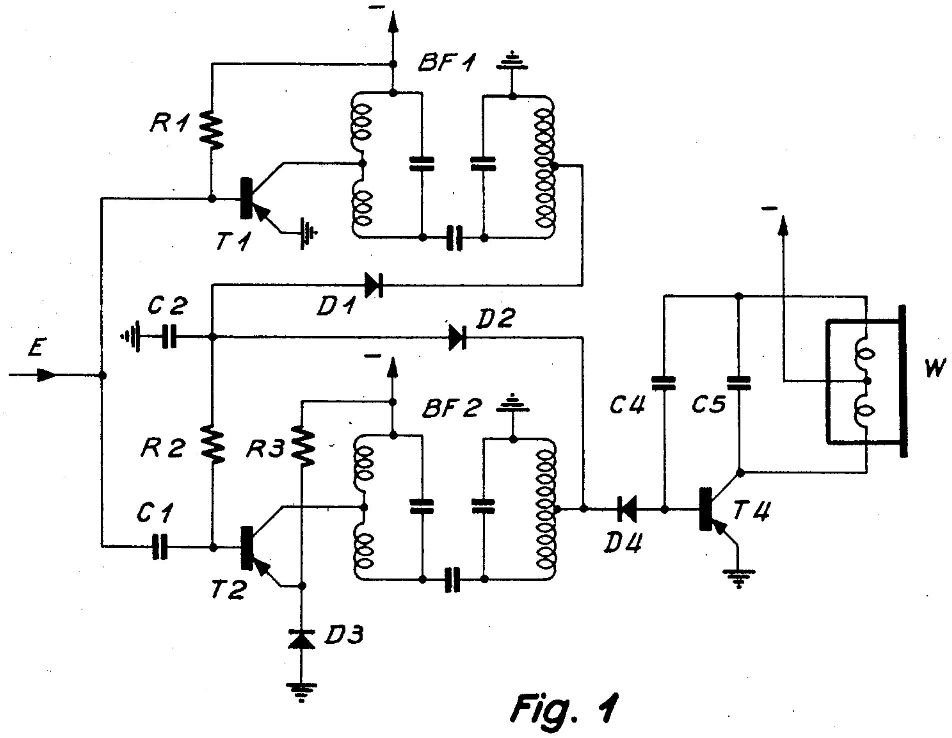
FIG. 1 shows a circuit diagram for evaluating a sequence of two frequencies, consisting entirely of electronic components.

In a second embodiment of the invention illustrated in FIG. 1 the blocking and holding of circuit components is effected by purely electronic means. The signal supplied to the circuit at E passes in one case directly, and in the other case through the condenser C1, to the bases of the two transistors T1 and T2. The base of the transistor T1 receives across the resistor R1, a negative bias relative to the emitter, so that this transistor is conductive and passes the received signal, amplified, to the band fitler BF1. The base of the transistor T2 has a positive bias with respect to the emitter so that no current flows therein. This bias is originated by the winding of the voltage divider consisting of the resistor R3 and the rectifier D3, this voltage divider imparting a negative bias with respect to ground, to the emitter of the transistor T2, whereas the base thereof is grounded through the resistor R2, the rectifier D1 and the coil of the band filter BF1. Owing to the resistance characteristic dependent on current, of the rectifier, this bias is substantially constant. When a signal of a frequency corresponding to the pass frequency of the first channel arrives at the input E of the circuit, the signal arising at the output of the band filter BF1 is rectified by the rectifier D1, whereby the condenser C2 is charged negatively, and the base of the transistor T2 receives, through the resistor R2, a negative potential. Inasmuch as this potential is more negative than that of the emitter, the transistor T2 is rendered conductive so as to amplify also the signal received from the input E, which fact, however, is of no consequence as the band filter 2 is tuned to a different frequency than the band filter 1. When the frequency passing through the first channel has ceased, the condenser C2 is discharged through the emitter and the base of the transistor T2 and thus maintains the channel 2 in the unblocked condition. If during the time the discharge takes, a signal of the pass frequency of the second channel arrives at the input E, this signal is amplified in the transistor T2 and passes to the band filter BF2, at the output of which it is rectified by the rectifiers D2 and D4. The negative charge of the condenser C2 is maintained through the rectifier D2, and through the rectifier D4 a negative potential is applied on the base of the transistor T4. As long as a signal passes through the second channel, therefore, on the one hand the transistor T2 is maintained in unblocked condition and on the other hand, a current passes in the transistor T4 from the emitter to the base whereby the transistor is rendered conductive also between the emitter and the collector. The transistor T4 forms part of a tone generator which is designed similarly to that referred with reference to the first embodiment illustrated in FIG. 2, with the sole difference that the path of the feed-back does not lead across a resistor, but via the condenser C4, for the reason that here the bias for the base does not derive from the battery, but from the amplified signal. The condenser C4 serves in this connection at the same time as a smoothing condenser for the pulsating direct current deriving from the rectifier. The tone generator operates as long as a signal passes through the second channel. Here too, the principle of the circuit resides in that by signals passing through the first channel (BF1), the second channel (BF2) is unblocked and that by signals passing in the second channel, on the one hand this unblocked state is maintained and on the other hand, an alert signal is released.

Figure 3:
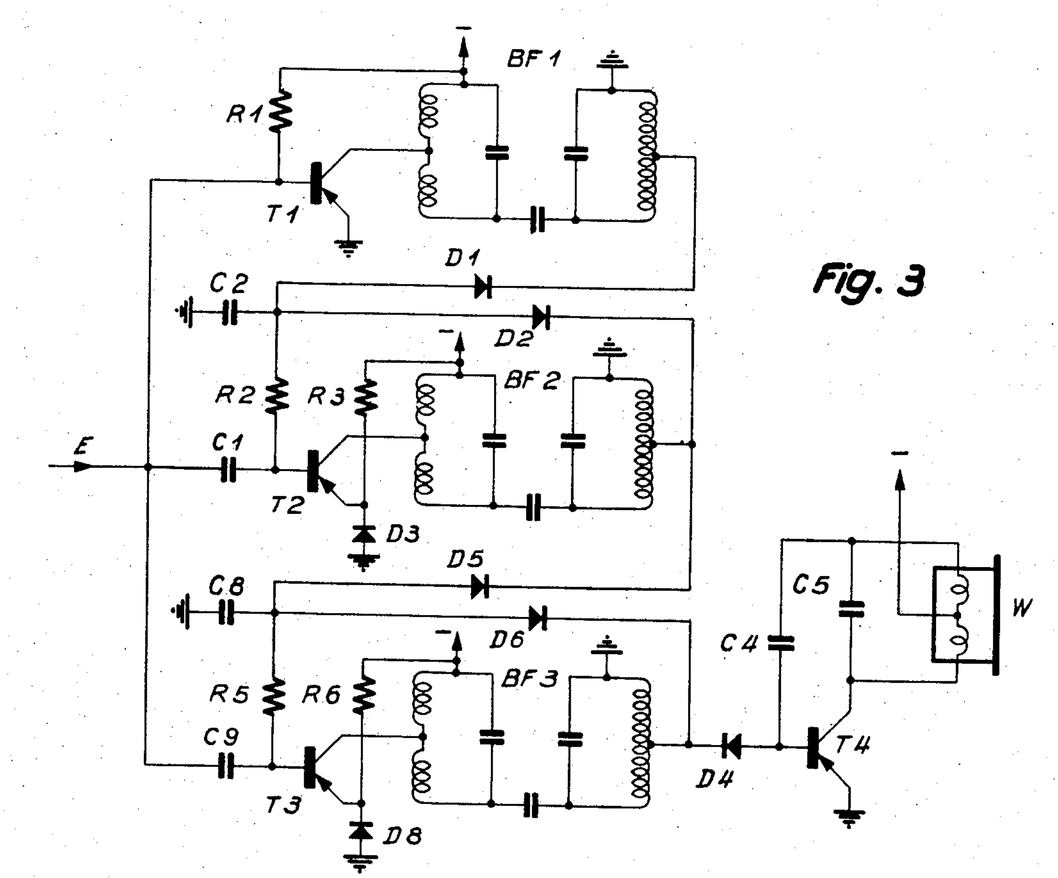
FIG. 3 shows a circuit diagram for evaluating a sequence of three frequencies, using only electronic components.
Figure 4:
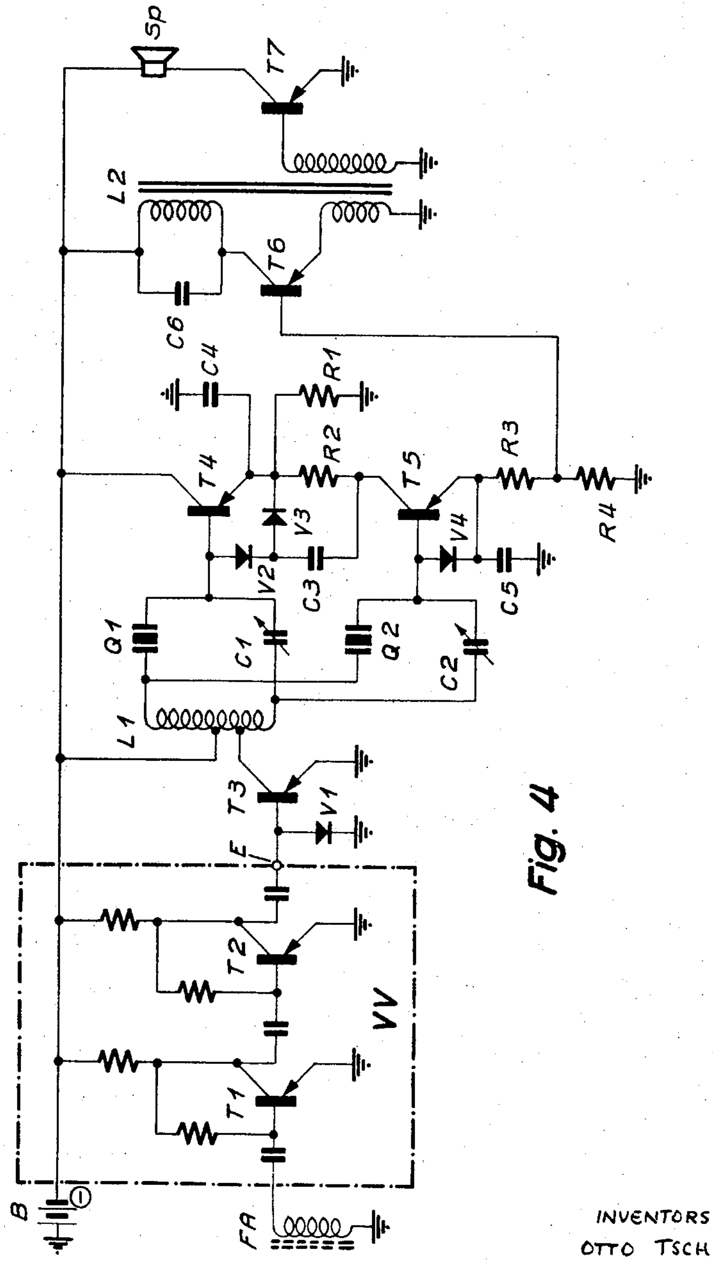
FIG. 4 illustrates a modified circuit for evaluating a sequence of two frequencies using electronic components exclusively.

The third embodiment shown in FIG. 3 comprises three channels, the receiver incorporating this circuit forming part of the system wherein the central station, for every locating call, emits a sequence of three frequencies. On principle, the circuit corresponds to that shown in and discussed with reference to FIG. 1. In view of the increased number of circuit components required in the circuit of FIG. 3, for a part thereof reference symbols other than those used in FIG. 1 are employed. Inasmuch as, however, the circuits correspond in most details, the following description does not refer to all circuit components bearing reference symbols not mentioned before. The signal is supplied to the circuit at point E the same as in the circuits described above, and passes, on the one hand, directly on the base of the transistor T1 which forms part of the first channel, and on the other hand, via the condensers C1 and C9, to the bases of the transistors T2 and T3 which form part of the second and third channel, respectively. In the condition of rest, the two transistors T2 and T3 are non-conductive for the reason that their emitters, as noted with reference to the first embodiment of the invention, have small negative bias with respect to the bases. A signal passing through the first channel (BF1) renders the transistor T2 conductive whereby the second channel is unblocked. When from point E, a frequency is supplied which corresponds to the tuning of the second channel (BF2), the transistor T2 is maintained, through the rectifier D2, in the unblocked condition. During the interval between the first and the second frequency of the incoming sequence, the condenser C2 maintains this unblocked condition. The third channel and the tone generator correspond exactly to the second channel and the tone generator of the second embodiment of the invention shown in FIG. 1. During the interval between the second and third frequency of the incoming sequence, the condenser C8 maintains the unblocked condition. The tone generator operates as long as a signal passes through the third channel. Corresponding to the other embodiments, the principle of the circuit resides in that by signals passing through the first channel (BF1), the second channel (BF2) is unblocked; that further, by signals passing through the unblocked second channel, on the one hand this unblocked condition is maintained and on the other hand, the third channel (BF3) is unblocked, and that by signals which pass through the unblocked third channel, on the one hand this unblocked condition is maintained and on the other hand, the alert signal is released.

In the embodiment of the invention according to FIG. 4, the signal passes from the point E to the base of the transistor T3. This base is not biased relative to the emitter, so that in the condition of rest, no current passes from the emitter to the collector. During each negative half-wave of a supplied signal, however, current passes from the emitter to the base, with the result that an amplified current passes through the collector and the coil L1 to the battery. The coil L1 thus receives current only during the negative half-waves supplied to the transistor T3. During positive half-waves the current passes through the rectifier V1. This circuit which exists also with further circuit stages, results in a material saving of current of call receiving sets in their condition of rest. The voltage generated in the coil is transformed upwardly by the coil for purposes of adaptation to the following high resistance circuit components, and is passed to two crystal filters. Each of these crystal filters consists in a well known fashion of a crystal (Q1, Q2) and a neutralizing condenser (C1, C2), which neutralizes the parallel capacitance of the correlated oscillating crystal, in that the voltage is supplied to the crystal and the condenser in push-pull fashion. The characteristic of such a filter corresponds to the series resonance characteristic of an oscillating crystal. For this reason, only those of the applied voltages the frequencies of which correspond to the series resonances of the oscillating crystals, pass to the bases of the transistors T4 and T5. The emitter and collector electrodes of these two transistors are, together with the resistors R2, R3, and R4, connected in series between the battery and ground. The emitter of the transistor T4 is grounded through the resistor R1; the collector of the transistor T5 is grounded through the resistors R2 and R1. The emitter of the transistor T5 is also grounded via the resistors R3 and R4, so that this transistor, in the condition of rest of the receiver, is not in a state of preparedness for amplification purposes. The conditions with the transistor T4 resemble those of the transistor T3, in that, in the position of rest, it is ready to amplify although no current passes. In the place of only one rectifier, two rectifiers V2, V3 connected in series are inserted between the base and the emitter. The forward directions of these two rectifiers are so selected relative to the forward direction of the transistor between the emitter and the base, that the said elements can be passed sucessively in the forward direction.

The foregoing description of the circuits show clearly that nothing happens in the receiver as long as a frequency is received which does not correspond to the series resonance frequency of the oscillating crystal Q1. When such a frequency is received, however, current passes through the oscillating crystal Q1. In a well known manner, described above with respect to the transistor T3, current passes during any negative half-wave meeting the base of the transistor T4, from the emitter to the collector. This current generates in the resistor R1 a direct voltage, as the alternating component is absorbed by the relatively large condenser C4 which for example, may be in the order of 30$\mu$ F. The condenser C4 is thus charged to the direct voltage arising across the resistor R1. The amplifying ratios of the first stages and the transmission ratios of the repeating coil L1 are so selected that the voltage arising during the negative half-wave of the supplied signal, between the base of the transistor T4 and ground, is larger than the battery voltage so that the condenser C4 is nearly charged to the battery voltage.

In consequence of the voltage across R1 and C4, also the collector of the transistor T5 receives through the resistor R2, a negative bias with respect to ground, whereby T5 is placed in a state of readiness for amplification purposes. Inasmuch as, however, the base and the emitter of the transistor T5 are connected by means of the rectifier V4 and thus are at the same potential, the transistor T5, at first, is nonconductive. When the frequency corresponding to the resonance of the oscillating crystal Q1 ceases to act, the condenser C4, owing to its relatively large capacitance, still maintains for a certain time, the negative potential on the collector of the transistor T5. If during this time, the receiver receives a frequency which corresponds to the series resonance frequency of the oscillating crystal Q2, the transistor T5 amplifies the negative half-wave of this voltage in the same manner, as was described above with respect to transistors T3 and T4. This causes the generation of a potential on resistors R3 and R4, on the one hand, and on resistor R2, on the other hand. The alternating component of the collector current of the transistor T5 is absorbed by the relatively large condenser C5, with the result that direct current flows in the resistors R3 and R4. The direct voltage thus generated serves, in a manner to be explained below, for releasing the alert signal. The alternating component of the pulsating voltage arising on the resistor R2 is passed across the condenser C3 to the point of junction of the two rectifiers V2 and V3. The signal amplified by the transistor T5 then acts across the condenser C3 on the base of the transistor T4 in the same manner as a signal supplied via the oscillating crystal Q1. This results in that the negative half-wave of the current supplied across the condenser C3, also passes through the emitter and the base of the transistor T4 and through the rectifier V2, whereas the positive half-wave passes through the rectifier V3. In this matter, the signal incoming via the oscillating crystal Q2 serves not only for controlling the transistor T5, but moreover, indirectly, also the transistor T4, whereby during the reception of the frequency corresponding to the series resonance frequency of the oscillating crystal Q2, the condenser C4 remains charged and the further operation of the transistor T5 is insured. Thus, a first frequency is relied on to unblock the transistor T5 which is correlated with the second channel (second frequency), and a second frequency serves to maintain the same in the unblocked condition.

The alert signal emitted by the receiver which, as in the previously described embodiments, is an acoustic signal, is generated in the embodiment of FIG. 4 in a manner which somewhat deviates from that employed in the other embodiments. It is initiated by the voltage arising on the resistor R4. The transistor T6, in the position of rest where base and emitter are grounded, carries no current. In its collector circuit, an oscillating circuit formed by the condenser C6 and a winding of the coil L2 is provided, while the emitter circuit contains a reaction coil. When the transistor T6 is unblocked by the supply of a negative potential to the base, an oscillation is generated which through another winding of the coil L2, is passed to the base of the transistor T7, whereby the transistor T7 is rendered conductive during the negative half-waves. The amplified current passing through the emitter and the collector of this transistor, energizes a small loudspeaker *Sp*, whereby the person carrying the receiving set is alerted to the fact that there is an incoming call.

The invention is not limited, of course, to the four embodiments described in the foregoing specification and illustrated in the drawings. Other approaches may be contemplated for blocking the channels, opening them and maintaining them in an open or unblocked condition. The mode of pre-amplification, if desired accompanied by demodulation as well as the generation of the alert signal do not form part of the invention and therefore, may be effected in any known manner. The number of channels provided in the receiver depends on the overall design of the system and on principle, is independent of the circuit principles employed. Thus, the number of channels provided in the receiving set, of course, may exceed the two or three channels referred to herein for purposes of illustration rather than limitation.

We wish it to be understood that we do not desire to be limited to the details of construction, circuit arrangement or operation shown and described herein as quite a number of modifications within the scope of the following claim are likely to occur to workers in this field which would not depart from the spirit of this invention nor involve any sacrifice of the advantages thereof.

We claim:

In a circuit including transistors, for initiating an action in response to an incoming signal consisting of a sequence of two distinct frequencies, particularly for use in portable receiving sets, and comprising two channels corresponding to two frequencies contained in said sequence, the received frequencies being passed to said channels in parallel, each channel containing a filter tuned to a specific one of the frequencies of said sequence, and wherein means are provided for blocking the second channel in the condition of rest, and for unblocking this second channel in response to a signal passing through the first channel, the signal passing in the second channel maintaining said unblocked condition, the improvement consisting in that each channel comprises a transistor having a collector, an emitter and a base, the collector and emitter electrodes being connected in series through at least one resistor in such a manner that the said resistor is disposed between the emitter of the first, and the collector of the second transistor, a large condenser and means connecting the emitter of the first transistor with one pole of said large condenser, the other pole of said large condenser being connected to a potential which is substantially constant with respect to the potential of the collector of the first transistor, another condenser, and means connecting said other condenser between a point having at least substantially the potential of the collector of the second transistor and another point, means including a rectifier connecting said other point with the base of the first transistor, and means including another rectifier connecting said other point with the emitter of the first transistor, the forward directions of the said rectifiers being so disposed with respect to the forward direction between base and emitter of the first transistor that said two rectifiers, the base and the emitter of the first transistor form a ring circuit which can be passed in the forward directions of the elements forming said ring circuit.

References Cited in the file of this patent

UNITED STATES PATENTS

| | | |
|---|---|---|
| 2,255,162 | Hart | Sept. 9, 1941 |
| 2,547,025 | Noble | Apr. 3, 1951 |
| 2,899,547 | Crow et al. | Aug. 11, 1959 |
| 2,900,534 | Chater | Aug. 18, 1959 |

FOREIGN PATENTS

| | | |
|---|---|---|
| 799,360 | Great Britain | Aug. 6, 1958 |